United States Patent [19]

Regenscheid

[11] Patent Number: 5,191,181

[45] Date of Patent: Mar. 2, 1993

[54] SEALING THERMOPLASTIC MEMBER DEVOID OF CONDUCTIVE MATERIAL

[75] Inventor: Duane M. Regenscheid, Austin, Minn.

[73] Assignee: Geo. A. Hormel & Co., Austin, Minn.

[21] Appl. No.: 561,059

[22] Filed: Aug. 1, 1990

[51] Int. Cl.$^5$ .............................................. H05B 6/00
[52] U.S. Cl. ............................. 219/10.41; 219/10.53; 219/10.73; 219/10.75; 53/306; 53/478; 156/69; 156/379.7
[58] Field of Search ............... 219/10.41, 10.53, 10.71, 219/10.75, 10.79, 10.73, 10.55 F, 10.55 E, 243; 53/373.8, 478, 485, 306; 156/69, 379.7, 379.8

[56] References Cited

U.S. PATENT DOCUMENTS

| | | | |
|---|---|---|---|
| 2,649,392 | 8/1953 | Marshall | 53/478 |
| 2,875,563 | 3/1959 | Moore | 53/478 |
| 3,060,652 | 10/1962 | Eckman | 53/478 |
| 3,367,808 | 2/1968 | Edwards | 156/69 |
| 3,460,310 | 8/1969 | Adcock et al. | 53/39 |
| 3,549,440 | 12/1970 | Adcock et al. | 156/69 |
| 3,909,326 | 9/1975 | Renck | 156/69 |
| 4,104,498 | 8/1978 | Gerber | 219/10.43 |
| 4,195,214 | 3/1980 | Gerber | 219/10.79 |
| 4,248,653 | 2/1981 | Gerber | 156/272 |
| 4,344,814 | 8/1982 | McLaren | 156/581 |
| 4,539,456 | 9/1985 | Mohr | 219/10.69 |
| 4,693,391 | 9/1987 | Roth | 200/359 |
| 4,707,213 | 11/1987 | Mohr et al. | 156/380.2 |
| 4,740,663 | 4/1988 | Roth et al. | 219/10.79 |
| 4,747,175 | 7/1988 | Mohr et al. | 219/10.79 |
| 4,754,113 | 6/1988 | Mohr et al. | 219/10.79 |
| 4,757,914 | 7/1988 | Roth et al. | 220/359 |
| 4,853,510 | 8/1989 | Mohr et al. | 219/10.79 |
| 4,867,336 | 9/1989 | Stewart | 220/359 |
| 4,890,758 | 1/1990 | Gailus | 220/270 |
| 4,936,943 | 6/1990 | Kubis et al. | 156/580 |
| 4,941,306 | 7/1990 | Pfaffmann et al. | 53/306 |
| 4,992,636 | 2/1991 | Namiki et al. | 219/10.55 E |
| 5,047,605 | 9/1991 | Ogden | 219/10.41 |

OTHER PUBLICATIONS

Attachment III—Patent Abstracts from Computer Search.
Attachment IV—Article Abstracts from Computer Search.
Attachment V—"Unraveling the Myths and Mysteries of Induction Sealing", William F. Zito, *Journal of Packaging Technology* (Jan. 1990).

Primary Examiner—Geoffrey S. Evans
Assistant Examiner—Tu Hoang
Attorney, Agent, or Firm—Merchant, Gould, Smith, Edell, Welter & Schmidt

[57] ABSTRACT

The present invention provides a method and an apparatus for induction welding a first plastic member to a second plastic member. A contacting portion of the first plastic member is clamped into contact with a contacting portion of the second plastic member. A current is induced in conductive material external to the plastic members and proximate one of the contacting portions to generate heat sufficient to bond the contacting portions together. The method and apparatus are capable of sealing plastic members that are devoid of conductive material.

19 Claims, 3 Drawing Sheets

SEALING THERMOPLASTIC MEMBER DEVOID OF CONDUCTIVE MATERIAL

FIELD OF THE INVENTION

This invention relates generally to induction welding, and more particularly, to induction welding of thermoplastic packaging materials using an external conducting element.

DESCRIPTION OF THE ART

There are several known methods for packaging items in plastic containers. According to a general method for packaging food, the food is sealed within a plastic container by heat sealing a lid to the container. The food is placed in the container, and the lid and the container are aligned relative to one another, so that a contacting portion of the lid is in contact with a contacting portion of the container. The contacting surface of each contacting portion includes compatible sealant material. The container is nested within a support member, which supports the contacting portion of the container, and a press member is brought into contact with the contacting portion of the lid. The contacting portions of the lid and the container are squeezed together between the press member and the support member, and the sealant material is heated to form a bond between the contacting portions, sealing the lid to the container.

One currently known method for heating the sealant materials may be referred to as conventional conduction heating. Generally, a conductor material, which heats up in response to electrical current passing through it, is positioned on the face of a press member. Current is passed through the conductor material in order to heat the press member, which is then forced against the contacting portions of the lid and the container. The press member is retracted from the lid to allow the contacting portions to cool.

There are certain disadvantages associated with the conventional conduction heating method due to the fact that the press member remains hot throughout the sealing process. First, it is desirable to expel any foreign matter from between the contacting portions before sealing the lid to the container to ensure that the package is cleanly and effectively sealed. However, when the hot press member is forced into contact with the contacting portion of the lid, it immediately drives heat through the contacting portions of the lid and the container. As a result, the sealant materials begin to flow, and it becomes relatively difficult to squeeze out any foreign matter.

Second, it is desirable to maintain the pressure against the contacting portions of the lid and the container until the sealant materials have cooled to ensure that there is no differential motion between the lid and the container, which might otherwise compromise the seal. However, since the press member remains hot, it is not possible to maintain the pressure during the cooling period because it is the press member that exerts the pressure on the contacting portion of the lid.

Another available method for heat sealing plastic members may be referred to as thermal impulse heating. Generally, a nichrome wire, which heats up relatively quickly in response to an electrical current passing through it, is positioned on the face of a press member. The press member, including the nichrome wire, is forced against the contacting portion of the lid to apply pressure against the contacting portions of the lid and the container. Current is pulsed through the nichrome wire in order to heat the wire and melt the sealant materials. Current flow is terminated to stop heating of the nichrome wire. The press member maintains the pressure against the contacting portions of the lid and the container until the sealant materials cool to prevent shifting of materials which may disrupt the quality of the seal. The nichrome wire is then cooled, or allowed to cool, prior to being forced into contact with the contacting portion of another lid in the next sealing iteration.

The thermal impulse method overcomes the two primary disadvantages of the conventional conduction heating method; namely, the press member is cool when it is forced into contact with the contacting portion of the lid, and the press member maintains pressure against the contacting portions of the lid and the container until the sealant materials cool. However, there are certain other disadvantages associated with the thermal impulse method. First, the thermal impulse method is not precise enough for critical packaging applications of shelf stable food products. It is difficult to control the current in the wire and to get uniform temperature along the wire. As a result, the quality of the seal cannot be adequately controlled. Second, the nichrome wire must have two terminating ends, and thus, it is impossible to seal a typical lid to a typical food container, since a closed loop is generally required.

Yet another currently known method for heating the sealant materials may be referred to as conventional induction heating. Generally, an induction coil, configured to substantially correspond with the contacting portions of the lid and the container, is positioned within a press member. Also, a conductive material is included in the contacting portion of the lid or the container. The press member is forced against the contacting portion of the lid to apply pressure against the contacting portions of the lid and the container. Current is passed through the induction coil to create an electromagnetic field, which induces an electromagnetic current in the conductive material included in the contacting portion of the lid or the container. The conductive material heats up, and the sealant materials flow together. Flow of current to induction member is terminated to stop heating of the conduction member allowing it and the newly made seal to cool. The press member maintains the pressure against the contacting portions of the lid and the container until the sealant materials cool.

The conventional induction heating method overcomes the disadvantages of the conventional conduction heating method; namely, the press member is cool when it is forced into contact with the contacting portion of the lid, and the press member maintains pressure against the contacting portions of the lid and the container until the sealant materials cool. Also, unlike the thermal impulse method, the conventional induction heating method is sufficiently precise for critical packaging applications for shelf stable food products, and it can be designed for sealing a closed loop. However, there are certain other disadvantages associated with the conventional induction heating method, which result from the need to include conductive material in the contacting portion of either the lid or the container. First, the inclusion of conductive material makes the packaging materials relatively complicated and thus, relatively expensive and difficult to recycle. Second, and more importantly, the conductive material is generally a distinct layer within the lid or container and thus, does not conform to the shape of the contacting portions of the lid and the container. As a result, the conductive material heats unevenly because of varying amounts of conductive material in the field and due to varying flux density around the contacting portions. Thus control of the sealing process is not merely a function of the amount of current in the induction coil. Third, although it is possible to control the process, relatively stringent control is required for each sealing iteration.

The present invention provides the advantages of the conventional induction heating method and also eliminates the need for including conductive material in one of the contacting portions. Thus, it is possible to clamp the contacting portions of the lid and the container prior to heating the sealant materials. As a result, any foreign matter located between the contacting portions is more readily expelled prior to sealing. Also, the present invention makes it possible to maintain pressure against the contacting portions of the lid and the container until the sealant materials cool. The inducement of a current is terminated, thereby stopping the heating and allowing the tooling to cool and thereby allowing the sealant materials to cool. As a result, there can be no differential movement between the lid and the container, which might otherwise occur due to a pressure difference between the contents of the sealed package and the surrounding environment.

The present invention does not require that conductive material be included in the contacting portion of the lid or the container. Instead, the present invention provides an external conductive material of minimal mass that heats up and cools down, or is caused to heat up and cool down, relatively quickly. As a result, the present invention is suitable for assembly line type packaging, where the time between sealing iterations is minimized.

The present invention makes it possible to precisely control the sealing process in various respects. For example, the distance between the induction coil and the conductive material is no longer an uncontrollable variable, since both are built directly into the platen. As a result, once a particular configuration is implemented, it consistently produces an established heat pattern.

Also, it is possible to control the shape of the conductor to precisely conform with the shape of the contacting portions of the lid and the container. As a result, design flexibility in the shape of the seal pattern is considerably improved, and the quality of the seal can be controlled simply by controlling the current in the induction member. Finally, since no conductive material is required in either the lid or the container, packaging materials can be made relatively inexpensive and recyclable.

SUMMARY OF THE INVENTION

The present invention provides a method for sealing a contacting portion of a first plastic member to a contacting portion of a second plastic member. The contacting portions are clamped into contact with each other, and a current is induced in a conductive element external to the plastic members and proximate one of the contacting portions. The current in the conductive element generates heat to bond the contacting portions to each other.

According to another aspect of the present invention, there is provided a method for heating clamped contacting portions of a first plastic member and a second plastic member of a type that seal together when heated. An external conductive element is positioned proximate the contacting portions, and a current is induced in the external conductive element. The current in the conductive element generates sufficient heat to seal the contacting portions together.

The present invention also provides an apparatus for sealing a first plastic member to a second plastic member. The apparatus includes a frame and a press member, operatively connected to the frame, which is designed to support the first plastic member. Also, there is means for clamping a contacting portion of the first plastic member to a contacting portion of the second plastic member. A platen, including an induction member and a conductive element, is operatively connected to the frame and moveable to a location proximate one of the contacting portions. Electrical current means generates an electrical current in the induction member, inducing an electromagnetic current in the conductive element. The current in the conductive element generates sufficient heat to seal the contacting portions to each other. Further, the induced current in the conductive element is terminated after generating sufficient heat to seal the contacting portions and the contacting portions are allowed to cool while still being clamped relative to one another.

According to another aspect of the invention, there is provided an apparatus for heating clamped contacting portions of a first plastic member and a second plastic member of a type that seal together when heated. In addition to a press member, which has a leading surface, the apparatus includes a conductive element, carried by the press member, and induction means, operatively connected to the press member, for inducing a current in the conductive element. Also, there is means, operatively connected to the press member, for moving the conductive element into substantial contact with the clamped contacting portions, so that the leading surface is substantially parallel to a plane defined by the contacting portions. The heat generated by the current in the conductive element causes the contacting portions to seal together.

According to yet another aspect of the present invention, there is provided a platen of a type that attaches to a machine for sealing a contacting portion of a first plastic member to a contacting portion of a second plastic member. The platen includes a carrier member, which has a leading surface, and means, secured to the carrier member, for attaching the platen to the machine. Also, there is a conductive element, positioned on the leading surface of the carrier member, and induction means for inducing a current in said conductive element to generate heat.

DESCRIPTION OF THE PREFERRED EMBODIMENT

The present invention is directed toward heat sealing a first plastic member to a second plastic member, where the term "plastic member" is intended to include any object having a contacting portion that includes a thermoplastic material, which serves as a sealant material. Generally, it is desirable that the contacting portions of the plastic members include an outer layer having a higher melting point than the sealant material, which forms the innermost layer, so that the sealant materials can be melted without affecting the exterior of the plastic members. Additionally, it is not necessary that either plastic member contain any conductive material, but the sealant material of the first plastic member must be compatible with the sealant material of the second plastic member.

Figure 1:
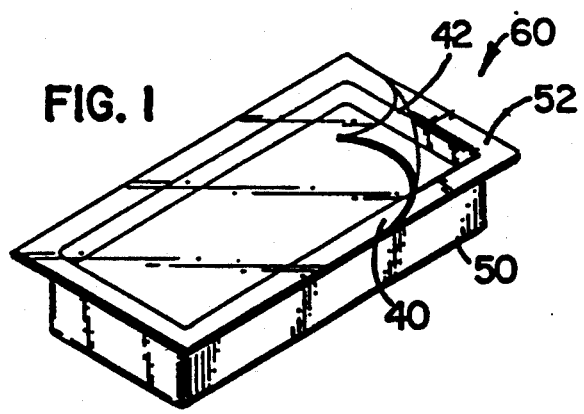
FIG. 1 is a perspective view of a first plastic member sealed to a second plastic member and partially peeled away.

For purposes of describing the present invention, the first plastic member is a sheet 40, and the second plastic member is a tray 50, as shown in FIG. 1. A contact portion 42 of the sheet 40 is sealed to a contact portion 52 of the container 50 to arrive at a sealed package 60. The contact portions 42 and 52 extend around the perimeters of the sheet 40 and the container 50, respectively.

Figure 2:
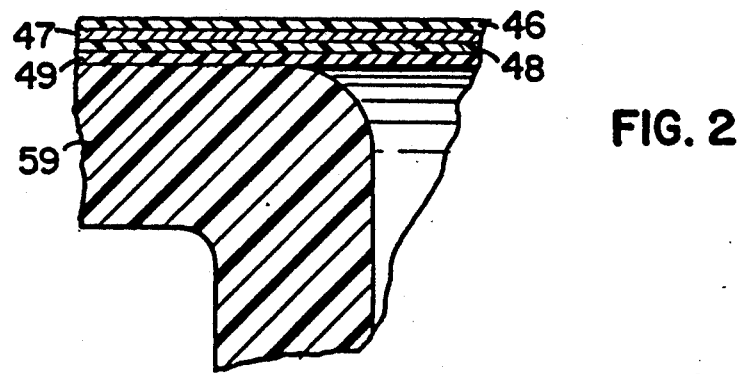
FIG. 2 is an enlarged partial sectional view of the sealed plastic members of FIG. 1.

Those skilled in the art will recognize that each of the plastic members may be made of various materials, so long as the sealant materials are compatible. Referring to FIG. 2, the sheet 40 and the tray 50 may be comprised of several distinct layers of material. For example, the sheet 40 may include layers of polyester 46, PVDC (polyvinylidene dichloride) 47, polyester 48, and polypropylene based, peelable sealant 49. On the other hand the sheet 40 and the tray 50 may be comprised of a single material. For example, the tray 50 may consist solely of high melt strength polypropylene homopolymer 59, which is a compatible sealant for the sealant 49 of the sheet 40. Thus, although the plastic members will be referred to simply as a sheet and a tray for purposes of describing the invention, it will be recognized that the invention is applicable to plastic members of various types, shapes, and compositions.

Figure 3:
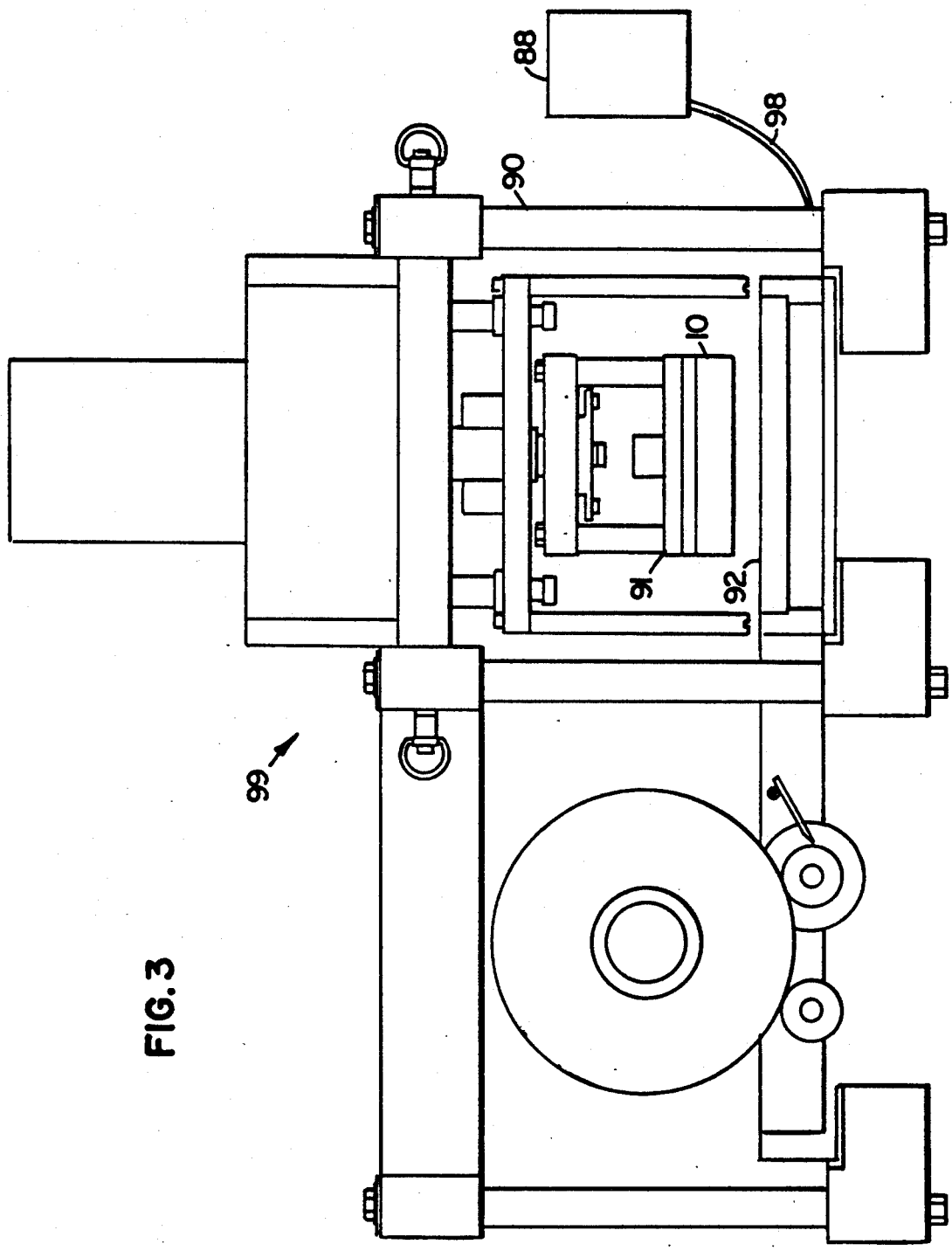
FIG. 3 is a front view of a packaging apparatus.

Referring to FIG. 3, a packaging apparatus 99 is operatively connected by a cable 98 to a power supply means 88. For purposes of describing the present invention, except for platen 10 and power supply 88, the packaging apparatus 99 is a lab sealer, otherwise suitable for conventional conduction sealing, that is commercially available through Raque Food Systems, Inc. of Louisville, Kentucky, and the power supply means 88 is a 2½ KW RF induction heating generator power supply that is commercially available through LEPEL Corporation of Edgewood, New York. Those skilled in the art will recognize that the invention is not limited to the particular packaging apparatus and power supply means described herein.

Figure 4:
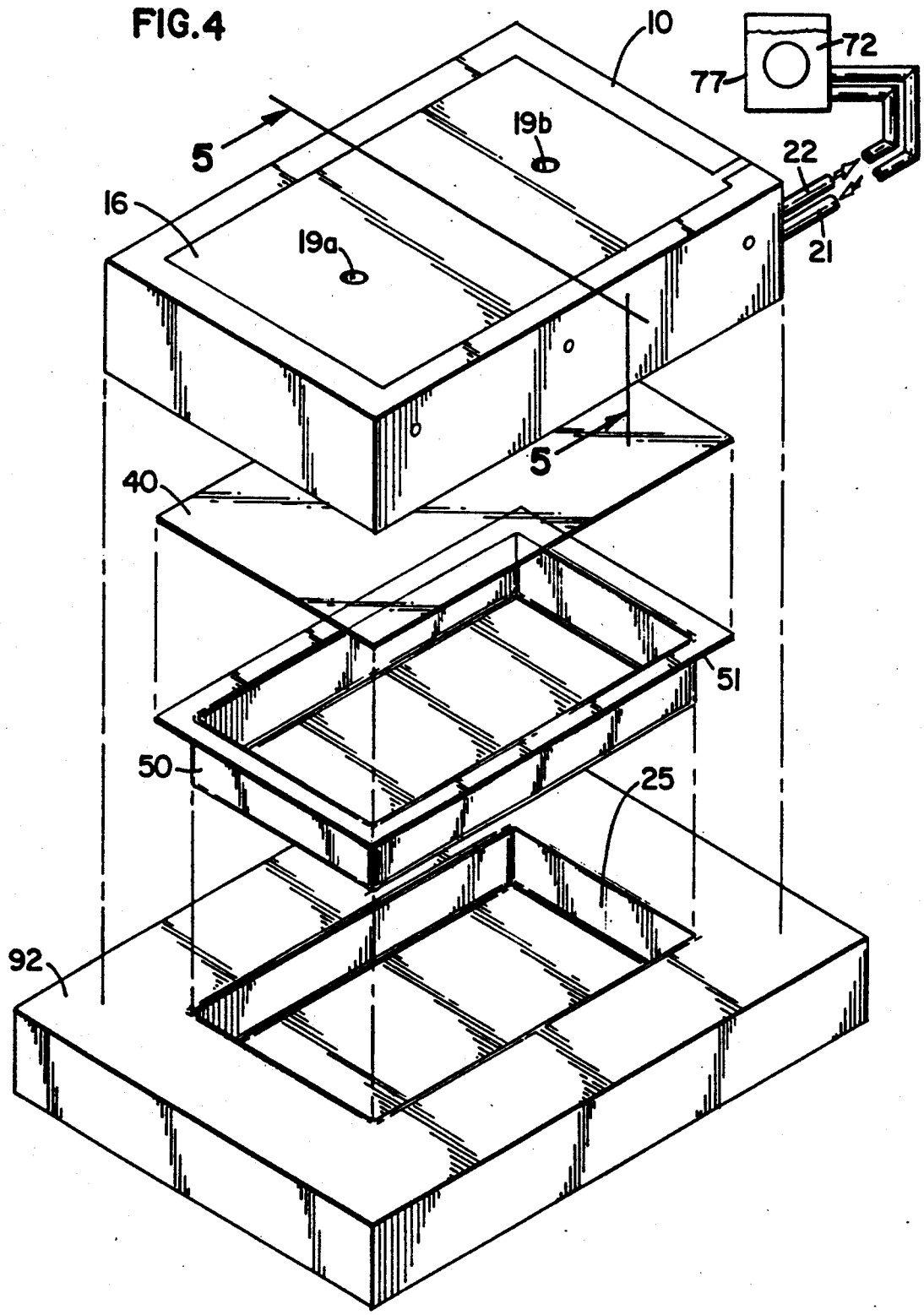
FIG. 4 is a diagrammatic perspective view of a platen and a support member of the packaging apparatus of FIG. 3, shown in alignment with the first plastic member and the second plastic member of FIGS. 1 and 2.

The packaging apparatus 99 includes a frame 90, to which a press member 91 and a support member 92 are operatively connected. Referring to FIG. 4, platen 10 and the support member 92 are shown in relative alignment with each other, and the sheet 40 and the tray 50 are shown in projection therebetween. The support member 92 includes a recess 25, which is designed to receive the tray 50 and support peripheral lip 51. Bolt holes 19a and 19b provide means for attaching platen 10 to the press member 91.

Figure 5:
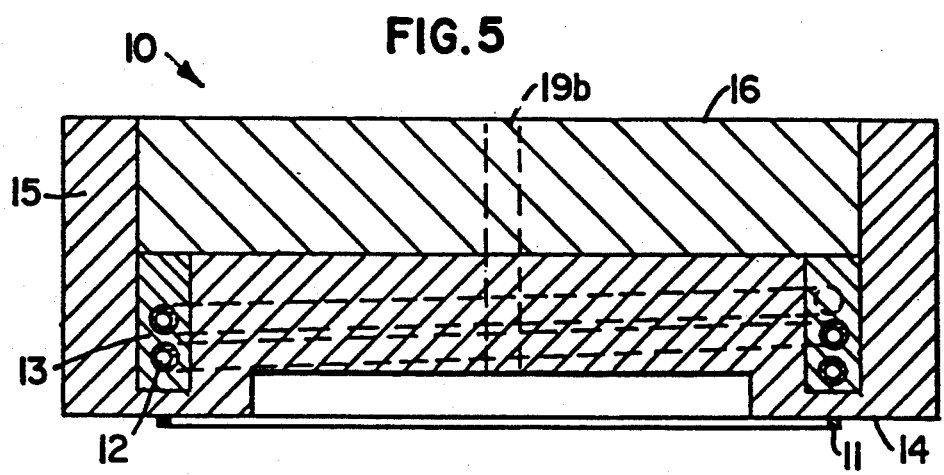
FIG. 5 is a sectioned view of the platen of FIG. 4.

The platen 10, which is shown in greater detail in FIG. 5, includes a conductive element 11 and an induction member 12. The conductive element 11 is positioned on leading surface 14 of carrier member 15. The shape of the conductive element 11 substantially corresponds to the shape of the contacting portions 42 and 52, since it is the shape of the conductive element 11 that will determine the shape of the seal. Thus, for purposes of sealing the sheet 40 to the tray 50, the conductive element 11 is a substantially rectangular loop. The shape of the induction member 12, which is positioned proximate the conductive element 11, substantially corresponds to the shape of the conductive element 11. Thus, the induction member 12 is also substantially rectangular. Those skilled in the art will recognize that the shape of the induction member need not conform to the exact shape of the conduction member. The induction member 12 is embedded in a section of thermally conductive compound 13 located within the carrier member 15. As shown in FIG. 4, the induction member 12 includes an input member 21 and an output member 22 for connecting the induction member 12 to the power supply means 88. Plug member 16 is removable to allow access to the section of thermally conductive compound 13 and the induction member 12.

To seal a package, the tray 50 is positioned within the recess 25 and most likely filled with some product. The sheet 40 is positioned on the tray 50 in such a manner that the contacting portions 42 and 52 are aligned. The positioning of the sheet 40 can be accomplished by hand or by other known methods. For example, the sheet 40 could be held in relative alignment by suction applied through the press member 91. With the sheet 40 in contact with the tray 50, or otherwise aligned, the press member 91 is moved toward the support member 92 in order to clamp the contacting portions 42 and 52 together. Those skilled in the art will recognize that the invention is not limited to this particular arrangement. For example, the support member 92 could move relative to the press member 91. Also, the induction member 12 and/or the conductive element 11 could be located in the support member 92, rather than the press member 91.

The contacting portions 42 and 52 are considered to be "clamped" when the pressure on the contacting portions 42 and 52 corresponds with the control parameters for a particular sealing process. If there is no foreign matter to be expelled from between the contacting portions 42 and 52, the pressure is dependent on the requirements for heat sealing the contacting portions together. Additionally, it may be necessary that the pressure from the clamping be sufficient to expel any foreign matter that might exist between the contacting portions 42 and 52. Otherwise, such matter may compromise the quality of the seal. The conductive element 11 must be sufficiently cool during the clamping step to ensure that any foreign matter is expelled before the sealant contaminants dry out and attach to the contacting portions. Also, expulsion of any foreign matter is more readily accomplished before the sealant materials begin to flow. Those skilled in the art will recognize that for some applications, there may be no foreign matter to be expelled, and this would effect the control parameters. Therefore, it can be appreciated that "clamped" means that contact between the contacting portions is sufficiently tight to create an effective seal between the contacting portions and if necessary expel foreign matter.

With the pressure on the contacting portions 42 and 52 set according to the process control parameters, a current is passed through the induction member 12, generating an electromagnetic field, which induces an electromagnetic current, or eddy current, in the conductive element 11. The induced current causes resistance-type heating of the conductive element 11, and the heat penetrates the exterior of the first plastic member 40, causing the sealant materials of the contact portions 42 and 52 to flow together. The current in the conductive element is terminated by turning off the current through the induction member 12, although it is understood that other means of accomplishing this may also be utilized. Since the current is terminated no further heat is generated, and the sealant materials may cool. The pressure on the contact portions 42 and 52 is maintained until the sealant materials are sufficiently cool, and the seal is established.

Since the induction member 12 is not in contact with the sheet 40, it is not necessary that the induction member 12 cool completely before and after each sealing process. Also, the conductive element 11 is capable of heating and cooling relatively rapidly, due to its minimal mass. As a result, packages can be sealed according to the present invention at a relatively rapid rate.

Although the conductive element heats and cools relatively quickly, it may be desirable to facilitate the cooling of the platen, as well as the conductive element, for high speed production lines. Such cooling helps draw heat away from the conductive element 11 and the sealed contacting portions 42 and 52. This facilitated cooling can be accomplished by causing a flow of coolant fluid in contact with the induction member 12. Referring to FIG. 4, coolant fluid 72 can be pumped by pump 77 through the tubing of the induction member 12 by way of input member 21 and output member 22. Alternatively, if the induction member were a wire, then the wire could be placed within a tube, made of plastic or some other material, and the coolant fluid could flow around the wire, through the coolant tube. Those skilled in the art will recognize that other cooling means for cooling the platen, as well as the conductive element, are available.

In one demonstration of the present invention, a Continental Can Company Magnum laboratory induction sealer, which is suitable for conventional induction sealing, was modified to model the present invention. An 8 mil thick sheet of flupopolymer was mounted below the induction coil of that machine to act as an electrical insulator. A 3 mil thick sheet of aluminum foil was mounted below the flupopolymer insulator such that it would be in contact with the contact portion of a sheet during heating.

A tray and lid stock similar to tray 50 and sheet 40 were used, and power was applied at a potentiometer setting of 3.00 for a duration of 400 milliseconds. Sealing pressure was applied at 95 pounds per square inch input.

It is contemplated that another example of the present invention would include the conductive element 11 being a Copper ring, 0.002 inches thick, which is coated with a layer of Nickel, 0.0007 inches thick. Alternatively, the Nickel coating could be infused with teflon to reduce sticking and wear. The induction member 12 is a coil of copper tubing. The thermally conductive compound 13 is CHO-TERM® 1641, which is a silicone compound commercially available through CHOMERICS of Hudson, New Hampshire. The carrier member 15 is a ceramic material with a metallic layer, such as a molymanganese layer that has been sintered into the ceramic base. The purpose is to allow a mounting surface for the copper to be plated. The platen 10 was attached to the packaging apparatus 99. 7.5 mil lid stock, including 0.5 mils polyester, 2.0 mils PVDC, 0.5 mils polyester and 4.5 mils of polypropylene based, peelable sealant may be sealed to a tray thermoformed from 35 mil polypropylene homopolymer. Power is supplied by the power supply means 88, which would be set for 110 KHZ at 50 milliseconds pulse length at a pressure of approximately 30 to 70 p.s.i.

The present invention provides means for clamping the contacting portions without melting the sealant materials and without burning or drying any contaminants into place. Thus, any foreign matter that might exist between the contacting portions can be more effectively expelled. As a result, the seal between the contacting portions is likely to be cleaner and more effective.

The present invention provides means for maintaining the contacting portions in tight contact with each other until the seal has cooled. Thus, there can be no relative movement of the contacting portions while the sealant materials are in a molten state. As a result, the seal is less likely to be affected by any potential pressure differential between the contents of the sealed package and the surrounding environment.

By placing the conductive element in the press member, rather than the package, the present invention eliminates certain difficulties in controlling the process parameters, which are associated with conventional induction heating. Generally, critical factors in generating a seal include the amount and duration of temperature applied, the amount and duration of pressure applied, and the configuration of the heating element. With conventional induction heating, a conductive element must be included in one of the members being sealed. Typically, a sheet of foil is included as a layer in the lid stock. The flux pattern formed by current passing through the induction member is not uniform. The pattern is not uniform because of the shape that the member is formed into. It is difficult therefore to shape the member as you would like because of the nonuniform flux patterns. As a result, when the current is induced in the foil, the heat generated is not uniformly distributed about the contacting portions of the members being sealed. The uncertain heat patterns make it difficult to generate seals according to particular desired attributes. For example, the seals are generally made relatively wide to compensate for variability of temperature along the contacting portions.

It is also understood that the induction means may be operatively connected to the platen by a variety of methods, even including passing the platen over/under the induction means.

The present invention eliminates any problems associated with varying flux density because the conductive element can be configured to precisely correspond to the contacting portions and/or the desired shape of the seal. As a result, greater precision can be achieved, and narrower seals can be generated. Although foil in the lid stock could be shaped to accommodate the conventional induction heating method, it is prohibitively expensive to do so for mass production purposes. However, with the present invention, it is cost effective to particularly configure the shape of the conductive element 11, since it only needs to be configured once.

Similarly, the distance between the induction member and the conductive element is fixed according to the design specifications of the press member, whereas in the past, the distance could vary from one sealing iteration to the next. As a result, with conventional induction heating, it was necessary to maintain the distance between the induction member and the conductive material in one of the contacting portions. However, this was essentially an uncontrollable variable due to variance in thickness of lid stock materials. With the present invention, the control of this distance is no longer a process parameter; rather, it is part of the initial tooling of the platen.

Finally, by eliminating the need for conductive material in the plastic members being sealed, the present invention provides advantages in terms of greater latitude in the choice of packaging materials. For example, packages can be made entirely of plastic, making the packaging more readily recyclable and less expensive to manufacture. Also, packages can be made devoid of foil to be microwave compatible.

While a specific embodiment of the invention has been disclosed, it is to be understood that such disclosure has been merely for the purpose of illustration, and that the invention is not to be limited in any member thereby. Various modifications of this invention will be apparent to those skilled in the art in view of the foregoing example. The scope of the invention is to be limited only by the appended claims.

What is claimed is:

1. A method of sealing a contacting portion of a first all plastic member devoid of electrical conductive material either in the first member or connected thereto to a contacting portion of a second all plastic member devoid of electrical conductive material either in the second member or connected thereto, comprising the steps of:
   (a) clamping the contacting portions into contact with each other;
   (b) inducing a current in a conductive element by an induction member, said conductive element is external to the plastic members and is proximate to one of the contacting portions, said induction member carried by a platen, whereby the conductive element generates heat to seal the contacting potions to each other;
   (c) maintaining the contacting portions in contact with each other until the contacting potions cool;
   (d) stopping the inducing of the current in the conductive element, thereby terminating heating of the conductive element and its surroundings to facilitate cooling of the conductive element, which is in contact with the contacting portions, thus allowing the contacting portions to cool; and
   (e) cooling said platen and induction member by a cooling means, said cooling means positioned proximate said induction member, said cooling means and said induction member carried by said platen.

2. A method according to claim 1, further comprising the step of positioning a product between the plastic members prior to the step of clamping the contacting portions into contact with each other.

3. A method according to claim 2, further comprising the step of passing a current through an induction member to induce the current in the conductive element.

4. A method of heating clamping contacting portions of a first all plastic member devoid of electrical conductive material either in the first member or connected thereto and a second all plastic member devoid of electrical conductive material either in the second member or connected thereto of a type that seal together when heated, comprising:
   (a) positioning an external conductive element proximate the contacting portions;
   (b) inducing a current in the external conductive element to generate heat to seal the contacting portions together;
   (c) passing a current through an induction member being proximate to the conductive element to induce the current in the conductive element said induction member positioned in a platen;
   (d) unclamping the contacting portions and the step of allowing the contacting portions to cool prior to unclamping; and
   (e) passing a flow of coolant in contact with the induction member to cool the induction member and the platen, said coolant carried in said platen.

5. An apparatus for sealing a first all plastic member devoid of electrical conductive material either in the first member or connected thereto to a second all plastic member devoid of electrical conductive material either in the second member or connected thereto, comprising:
   (a) a frame;
   (b) a support member, operatively connected to said frame, designed to support the second plastic member;
   (c) clamping means for clamping a contacting portion of the first plastic member to a contacting portion of the second plastic member;
   (d) a platen, including an induction member and a conductive element, operatively connected to said frame and moveable to a location proximate to one of said contacting portions;
   (e) power supply means for passing an electrical current through said induction member, wherein an electromagnetic current is induced in said conductive element, and said current generates heat to seal said contacting portions to each other; and
   (f) means for cooling said induction member and platen, said cooling means positioned proximate said induction member and both said cooling means and induction member positioned in and carried by said platen.

6. An apparatus according to claim 5, further comprising alignment means for aligning the first plastic member relative to the second plastic member.

7. An apparatus according to claim 6, wherein said clamping means includes a press member, operatively connected to said frame, wherein said press member operates in relative alignment with said support member to clamp the contacting portions.

8. An apparatus according to claim 7, further comprising means to stop the induction of current through said induction member.

9. An apparatus for clamping and heating contacting portions of a first all plastic member devoid of electrical conductive material either in the first member or connected thereto and a second all plastic member devoid of electrical conductive material either in the second member or connected thereto of a type that seal together when heated, comprising:
   (a) a platen, having a leading surface;

(b) a conductive element, carried by said platen;
(c) induction means, operatively connected to said platen, for inducing a current in said conductive element;
(d) movement means, operatively connected to said platen, for moving said conductive element into substantial contact with the contacting portions, wherein said leading surface is substantially parallel to a plane defined by the contacting portions, whereby heat generated in said conductive element causes the contacting portions to melt and to flow together; and
(e) means for cooling said induction member and platen, said cooling means positioned proximate said induction member and both said cooling means and induction member positioned in and carried by said platen.

10. An apparatus according to claim 9, wherein said conductive element is flush and parallel to said leading surface.

11. An apparatus according to claim 10, wherein said induction means includes an induction member, configured to at least generally correspond to said conductive element, and wholly embedded within said press member, being proximate to said conductive element and substantially parallel to said leading surface.

12. An apparatus according to claim 11, wherein said induction means includes power supply means, operatively connected to said induction member, for passing a current through said induction member and inducing a current in said conductive element, thereby heating said conductive element.

13. An apparatus according to claim 12, wherein said conductive element is a copper ring coated with nickel, and said induction member is a coil of copper tubing.

14. An apparatus according to claim 13, wherein the apparatus is part of a food packaging machine.

15. A platen of a type that attached to a machine for sealing a contacting portion of a first all plastic member devoid of electrical conductive material either in the first member or connected thereto to a contacting portion of a second all plastic member devoid of electrical conductive material either in the second member or connected thereto, comprising:
(a) a carrier member, having a leading surface;
(b) attachment means, secured relative to said carrier member, for attaching the platen to a machine;
(c) a conductive element, positioned on said leading surface of said carrier member;
(d) induction means for inducing a current in said conductive element to generate heat; and
(e) means for cooling said induction member and platen, said cooling means positioned proximate said induction member and both said cooling means and induction member positioned in and carried by said platen.

16. A platen according to claim 15, wherein said conductive element is a nickel-coated loop of copper.

17. A platen according to claim 16, wherein said induction means includes a power supply and a coil of copper tubing incased in a thermally conductive silicone compound positioned in said carrier member.

18. A platen according to claim 17, wherein said carrier member includes a ceramic base.

19. A platen according to claim 18, further comprising a coolant fluid and pumping means for pumping said coolant fluid through said copper tubing.

* * * * *